(12) United States Patent
Teramoto

(10) Patent No.: US 8,163,040 B2
(45) Date of Patent: Apr. 24, 2012

(54) METHOD FOR MANUFACTURING CYLINDRICAL BATTERY AND GROOVE-FORMING PROCESSING DEVICE OF CYLINDRICAL BATTERY

(75) Inventor: Kazutaka Teramoto, Osaka (JP)

(73) Assignee: Panasonic Corporation, Osaka (JP)

( * ) Notice: Subject to any disclaimer, the term of this patent is extended or adjusted under 35 U.S.C. 154(b) by 827 days.

(21) Appl. No.: 11/917,652

(22) PCT Filed: Jun. 9, 2006

(86) PCT No.: PCT/JP2006/311604
§ 371 (c)(1),
(2), (4) Date: Nov. 18, 2008

(87) PCT Pub. No.: WO2006/134836
PCT Pub. Date: Dec. 21, 2006

(65) Prior Publication Data
US 2009/0151863 A1  Jun. 18, 2009

(30) Foreign Application Priority Data

Jun. 16, 2005 (JP) .................. 2005-176094
Sep. 29, 2005 (JP) .................. 2005-283934
Jan. 20, 2006 (JP) .................. 2006-011808

(51) Int. Cl.
*H01M 2/02* (2006.01)
*B23P 19/04* (2006.01)
*B21D 22/00* (2006.01)

(52) U.S. Cl. ............... 29/623.2; 29/240; 29/731; 72/84; 72/208; 72/252.5

(58) Field of Classification Search ............. 72/84, 102, 72/105, 208, 252.5; 29/240, 731, 623.2
See application file for complete search history.

(56) References Cited

U.S. PATENT DOCUMENTS

| 1,711,075 | A | * | 4/1929 | Zimmerman | .................. 72/84 |
| 4,656,736 | A | * | 4/1987 | Volkhin et al. | ............ 29/731 X |
| 5,228,321 | A | * | 7/1993 | Shibasaka | .................. 72/84 |
| 5,653,138 | A | * | 8/1997 | Kruger et al. | .................. 72/84 |
| 2002/0104359 | A1 | * | 8/2002 | Dyke et al. | ................... 72/252.5 |

FOREIGN PATENT DOCUMENTS

| JP | 04-294828 | 10/1992 |
| JP | 10-255730 | 9/1993 |
| JP | 09-199092 | 7/1997 |
| JP | 09-245750 | 9/1997 |
| JP | 2000-021362 | 1/2000 |
| JP | 2005-019050 | 1/2005 |

* cited by examiner

*Primary Examiner* — Stephen J. Kalafut
(74) *Attorney, Agent, or Firm* — McDermott Will & Emery LLP

(57) ABSTRACT

A method for manufacturing a cylindrical battery includes allowing a cylindrical battery case (5) with a bottom to contain an electrode plate group, carrying out a groove-forming processing on an outside periphery of an opening of the battery case, disposing a sealing plate in the opening of the battery case through a gasket, and crimping and sealing the end of the opening of the battery case. In a groove-forming processing process in which the battery case is rotated and a rotatable groove-forming roller (15) comes into contact with and is gradually pushed into the outside periphery of the opening of the battery case in a state where a core (12) corresponding to the diameter of the opening of the battery case is fitted into the opening of the battery case to support the battery case from the inner peripheral side, a rotational speed is increased in accordance with increase in the diameter of the battery case so that the push-in amount of the groove-forming roller per unit rotation perimeter and per unit of time approximately becomes a certain value even if the size of the diameter of the battery case varies. Thus, a common groove-forming processing device can carry out the groove-forming processing on battery cases of different battery sizes to manufacture cylindrical batteries.

12 Claims, 7 Drawing Sheets

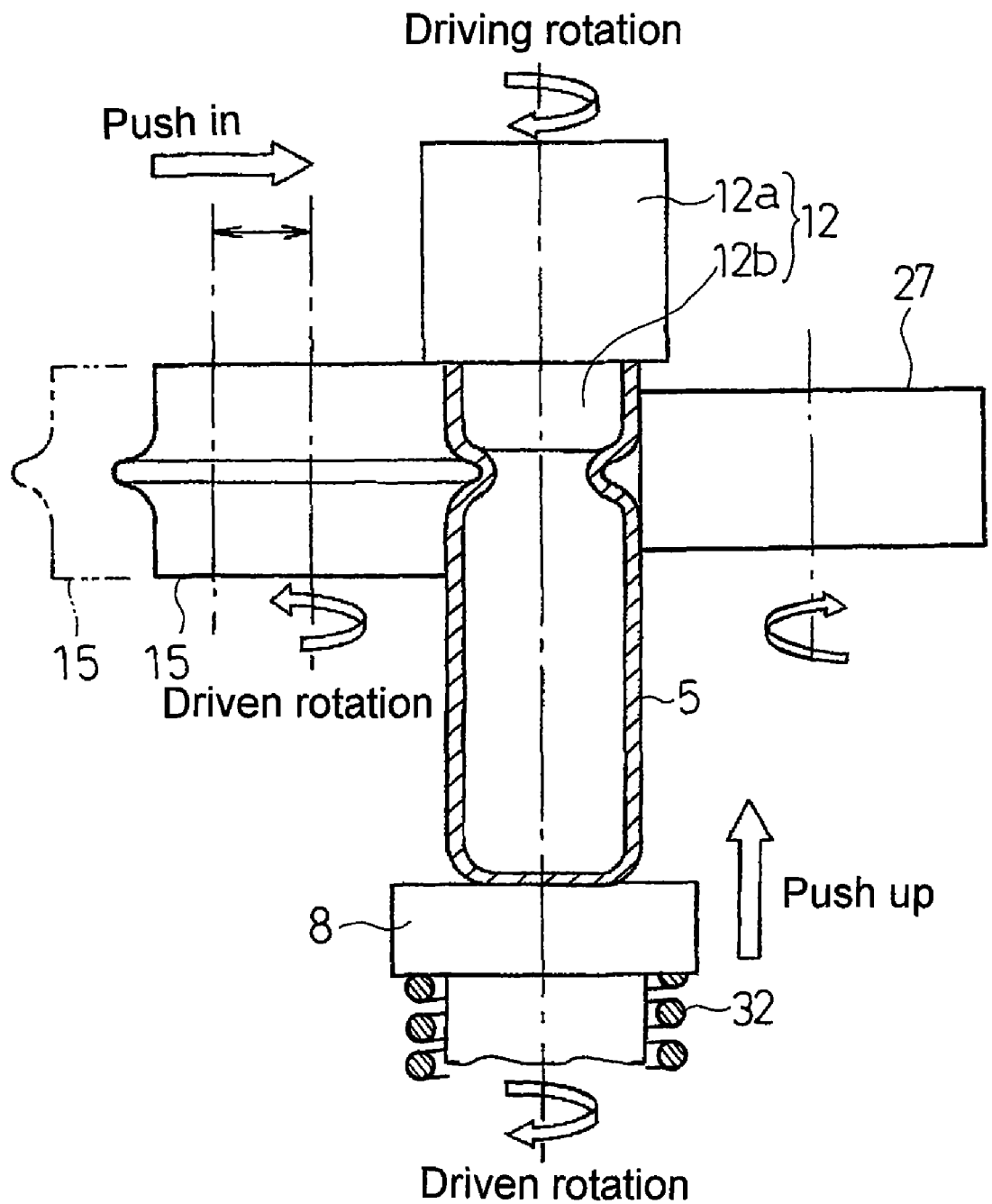

METHOD FOR MANUFACTURING CYLINDRICAL BATTERY AND GROOVE-FORMING PROCESSING DEVICE OF CYLINDRICAL BATTERY

RELATED APPLICATIONS

This application is the U.S. National. Phase under 35 U.S.C. §371 of International Application No. PCT/JP2006/311604, filed on Jun. 9, 2006, which in turn claims the benefit of Japanese Application No. 2005-176094, filed on Jun. 16, 2005, Japanese Application No. 2005-283934, filed on Sep. 29, 2005, and Japanese Application No. 2006-011808, filed on Jan. 20, 2006, the disclosures of which Applications are incorporated by reference herein.

TECHNICAL FIELD

The present invention relates to a method for manufacturing a cylindrical battery and a device used for the same, and in particular, relates to a manufacturing method for carrying out groove-forming processing on a battery case in the shape of a cylinder with a bottom and a groove-forming processing device.

BACKGROUND ART

In recent years, electronic equipment such as an AV device, a personal computer, and a portable communication device is rapidly made portable and cordless, and a hermetically sealed battery which has high energy density and a superior load characteristic is demanded as a driving power source of the electronic equipment and other motive devices. In particular, a lithium battery comes under the spotlight because of such many features that its energy density and voltage is high and shelf life is long.

For example, in order to form a cylindrical lithium battery, an electrode plate group is formed by winding a positive electrode plate and a negative electrode plate in a spiral shape with disposing a separator between them and the electrode plate group is contained in a cylindrical battery case with a bottom. After injecting a predetermined amount of electrolyte into the battery case, a ring-shaped groove-forming processing is carried out on an outside periphery in the vicinity of an opening of the battery case. Then, a sealing plate is inserted and disposed into the opening of the battery case through a gasket, and the rim of the opening of the battery case is crimped inside in a state where the sealing plate is mounted on a ring-shaped support section which is formed in the shape of a protrusion inside the battery case by a groove portion. A positive lead which is pulled out of an upper portion of the electrode plate group is welded to the sealing plate in advance of a sealing process.

There is a proposed method of groove-forming processing on the foregoing battery case in which a core of a top die and a bottom die sandwich and hold the top and bottom of the battery case. While the top and bottom dies rotate the battery case, a protrusion on the outside periphery of a groove-forming roller is pressed against the outside periphery of the battery case to form a groove portion. Also, at this time, pressure is applied to the battery case from above and below in order to restrain reduction in the wall thickness of an upper part of the groove portion (for example, refer to Patent Document 1).

Also, there is another proposed method of groove-forming processing on the battery case in which a bottom die holding the bottom of the battery case moves upward and a core tightly comes into contact with the opening of the battery case to rotate the battery case. In this state, a groove-forming roller is pressed against the outside periphery of the battery case and is pushed into it by a predetermined depth at a constant speed to form a groove portion. Also, at this time, the amount of pushing the bottom die up is adjusted and a wall material is supplied from a side wall of a lower part of the groove portion in order to prevent the end portion of the upper jaw of the groove portion from thinning down (for example, refer to Patent Document 2).

There is further another proposed method of groove-forming processing on the battery case in which the height of a receiving die receiving the bottom of the battery case is varied in accordance with the height of the battery case in order to carry out the groove-forming processing on the various types of battery cases which have the same diameter and different heights (for example, refer to Patent Document 3).

Patent Document 1: Japanese Patent Application Laid-Open No. 9-199092
Patent Document 2: Japanese Patent Application Laid-Open No. 2005-19050
Patent Document 3: Japanese Patent Application Laid-Open No. 2000-21362

DISCLOSURE OF THE INVENTION

Problems To Be Solved By The Invention

However, groove-forming processing devices for carrying out the processing methods disclosed in the foregoing Patent Documents 1 and 2 are structured as a single functional device which processes only a single size of the battery case because the diameter of the battery case differs in accordance with a battery size and there is an appropriate condition for groove-forming processing corresponding to each diameter. Thus, in order to manufacture various sizes of batteries, it is necessary to prepare the groove-forming processing devices on a battery size basis and hence there is a problem that increase in an investment in facilities brings about increase in the costs of the battery. The processing method disclosed in Patent Document 3 is adoptable only in the batteries having the same diameter and different heights. In addition to this, it is necessary to exchange the receiving dies in accordance with the heights and exchange operation is difficult and inefficient due to its structure so that the processing method cannot sufficiently solve the foregoing problems.

In view of the foregoing conventional problems, an object of the present invention is to provide a method for manufacturing a cylindrical battery in which a common groove-forming processing device can carry out groove-forming processing on battery cases of different battery sizes and the groove-forming processing device used for the groove-forming processing.

Means For Solving The Problems

The present invention provides a method for manufacturing a cylindrical battery, including: allowing a cylindrical battery case with a bottom to contain an electrode plate group; carrying out a groove-forming processing on an outside periphery of an opening of the battery case; disposing a sealing plate in the opening of the battery case through a gasket; and crimping and sealing an end of the opening of the battery case, wherein in a groove-forming processing process in which the battery case is rotated and a rotatable groove-forming roller comes into contact with and is gradually pushed into the outside periphery of the opening of the battery case in a state where a core corresponding to a diameter of the opening of the battery case is fitted into the opening of the battery case to support the battery case from an inner peripheral side, a rotational speed is increased in accordance with increase in the diameter of the battery case so that a push-in amount of the groove-forming roller per unit rotation perimeter and per unit of time approximately becomes a certain value even when the diameter of the battery case varies in size.

According to this configuration, even if the diameter of the battery case varies due to the different size of the battery, the groove-forming processing is carried out by adjusting the rotational speed of the battery case so that the push-in amount of the groove-forming roller per unit rotation perimeter and per unit of time approximately becomes a certain value. Thus, a required condition for groove-forming processing can be secured irrespective of variation in the diameter and hence it is possible to carry out the favorable groove-forming processing. Also, since a single battery production line can manufacture various sizes of cylindrical batteries by switching, facility costs can be reduced. In addition, since the tact time of the groove-forming processing is approximately maintained in constant even if the battery size varies, it is possible to efficiently manufacture the batteries while maintaining the speed of the production line and hence drastically reduce manufacturing costs.

When a receiving die which has a flat receiving face and is rotatable supports the bottom of the battery case from below and the rotatable core fitted into the opening of the battery case rotates the battery case, the battery case is driven to rotate at the vicinity of a processed portion from the side of the core which receives pressure by the groove-forming roller during the processing. Thus, torsion moment does not act on the battery case by rotational driving force. Accordingly, even if the diameter of the battery case is large and the battery case is rotated at a high speed, there is no fear that torsion or buckling occurs in the battery case so that it is possible to stably perform the groove-forming processing.

Furthermore, when the receiving die is pushed up in synchronization with pushing the groove-forming roller in and a push-up amount is regulated in accordance with the push-in amount in order to make a wall thickness of a thinnest portion of a processed groove 80% or more of a wall thickness of a peripheral wall, it is possible to certainly prevent the end portion of the upper jaw of a groove portion from thinning down and form an appropriate groove.

The present invention provides another method for manufacturing a cylindrical battery, including pressing and gradually pushing a rotatable groove-forming roller against and into an outside periphery of a battery case in the vicinity of an opening of the battery case to carry out groove-forming processing, while the battery case is rotated with a edge face of the opening of the battery case and a bottom face thereof being held from above and below. In the method, each battery case with a different diameter is rotated at a rotational speed which is increased in accordance with increase in the diameter of the battery case so that a push-in amount of the groove-forming roller per unit rotation perimeter and per unit of time approximately becomes a certain value. In addition to this, a rotatable backup roller which is in a fixed position makes contact with the outside periphery of the battery case on the opposite side of the groove-forming roller so that the backup roller prevents the occurrence of bending of the battery case by receiving a press force of the groove-forming roller.

According to this configuration, since the backup roller prevents the battery case from being bent by receiving the press force of the groove-forming roller, the backup roller acts so as to turn the escape of the battery case in the radial direction by the press force of the groove-forming roller toward the axial direction of the battery case. Thus, since the battery case after the completion of the groove-forming processing has only internal residual stress in the axial direction and does not have internal residual stress in the radial direction, its shape does not change in the radial direction due to the internal residual stress. Therefore, it is possible to secure a required shape with high accuracy.

In the foregoing manufacturing method, when a plurality of backup rollers to prevent the occurrence of bending of the battery case by receiving the press force of the groove-forming roller is provided in positions symmetric with respect to an extension line passing through respective axis of the groove-forming roller and the battery case, the battery case can be smoothly rotated while the plurality of backup rollers further certainly prevents the battery case from being bent by receiving the press force of the groove-forming roller. Therefore, it is possible to smoothly turn the escape of the battery case in the radial direction by the press force of the groove-forming roller toward the axial direction of the battery case.

The present invention provides a groove-forming processing device including: a receiving die for supporting a battery case; a core which is fitted into an opening of the battery case and is exchangeable corresponding to a diameter of the battery case; rotation driving means for rotating the battery case; a groove-forming roller which is rotatably supported and is pushed into an outside periphery of the opening of the battery case to carry out groove-forming processing on the opening of the battery case; roller push-in means for pushing the groove-forming roller into the outside periphery of the opening of the battery case; push-up means for pushing the receiving die upward; and control means for controlling the rotation driving means so as to increase a rotational speed in accordance with increase in a diameter of the battery case in order to make a push-in amount of the groove-forming roller per unit rotation perimeter and per unit of time approximately become a certain value even when the diameter of the battery case varies.

According to this configuration, even if the diameter of the battery case varies due to the different size of the battery, the groove-forming processing is carried out while the control means adjusts the rotational speed of the battery case so that the push-in amount of the groove-forming roller per unit rotation perimeter and per unit of time approximately becomes the certain value. Thus, the single groove-forming processing device can perform the groove-forming processing on the battery cases of different sizes, and an appropriate condition for groove-forming processing can be secured irrespective of variation in the diameter to form a favorable groove, so that the single groove-forming processing device can efficiently manufacture various sizes of cylindrical batteries at low costs. Furthermore, the tact time of the groove-forming processing is maintained in constant if the battery size varies. Accordingly, when a single battery production line manufactures various sizes of cylindrical batteries, it is possible to efficiently manufacture the batteries with maintaining line speed irrespective of variation in size. Therefore, it is possible to reduce manufacturing costs.

Furthermore, when the rotation driving means rotates the core and the receiving die is rotatable, the battery case is driven to rotate at the vicinity of a processed portion from the side of the core which receives pressure by the groove-forming roller during the processing. Thus, torsion moment does not act on the battery case by rotational driving force. Accordingly, even if the diameter of the battery case is large and the battery case is rotated at high speed, there is no fear that torsion or buckling occurs in the battery case so that it is possible to stably perform the groove-forming processing.

Furthermore, when the roller push-in means pushes the groove-forming roller into from the same position by the same push-in amount even when the diameter of the battery case varies and the groove-forming roller is exchangeable in accordance with variation in the diameter of the battery case, it is not necessary to change adjustment except for exchanging the core and the groove-forming roller even if the diameter of the battery case varies. Therefore, the structure of the device becomes simple and a tooling change is extremely simply carried out, and hence it is possible to efficiently manufacture various sizes of batteries at low costs.

When the receiving die is disposed in such a manner that the top face thereof is flush with a base plate and the push-up means can move the receiving die up, and the core, the rotation driving means, the groove-forming roller, and the roller push-in means are provided in a elevating frame which is vertically movable along a supporting frame erected on the base plate, the battery case is smoothly supplied from the base plate to the receiving die for processing. Furthermore, it is possible to easily correspond to variation in the height of the battery case by adjusting the height position of the elevating frame, so that it is possible to secure high productivity by the device with simple structure.

The roller push-in means may include a plate cam provided in a rotary shaft which rotates in conjunction with the push-up means and a movable member on which a cam follower making contact with the plate cam is fixed, the movable member being supported by the elevating frame movably in the radial direction of the core. In addition, the movable member supports the groove-forming roller. In this case, it is possible to allow the groove-forming roller to carry out stable push-in operation by simple structure, and hence stably perform the groove-forming processing.

When the backup roller which comes into contact with the outside periphery of the battery case on the opposite side of the groove-forming roller to prevent the occurrence of bending of the battery case by receiving the press force of the groove-forming roller is rotatably provided in a fixed position, the backup roller prevents the battery case from being bent by receiving the press force of the groove-forming roller. The backup roller acts so as to turn the escape of the battery case in the radial direction by the press force of the groove-forming roller toward the axial direction of the battery case. Accordingly, since the battery case after the completion of the groove-forming processing has only internal residual stress in the axial direction and does not have internal residual stress in the radial direction, its shape does not change in the radial direction due to the internal residual stress. Therefore, it is possible to secure a required shape with high accuracy.

Furthermore, when a plurality of backup rollers is provided in positions symmetric with respect to an extension line passing through respective axis of the groove-forming roller and the battery case, the battery case can be smoothly rotated while the plurality of backup rollers further certainly prevents the battery case from being bent by receiving the press force of the groove-forming roller. Therefore, it is possible to smoothly turn the escape of the battery case in the radial direction by the press force of the groove-forming roller toward the axial direction of the battery case.

BRIEF DESCRIPTION OF THE DRAWINGS

FIG. 7 is an explanatory view of the operation in a groove-forming processing process according to the embodiment;

BEST MODE FOR CARRYING OUT THE INVENTION

Figure 1:
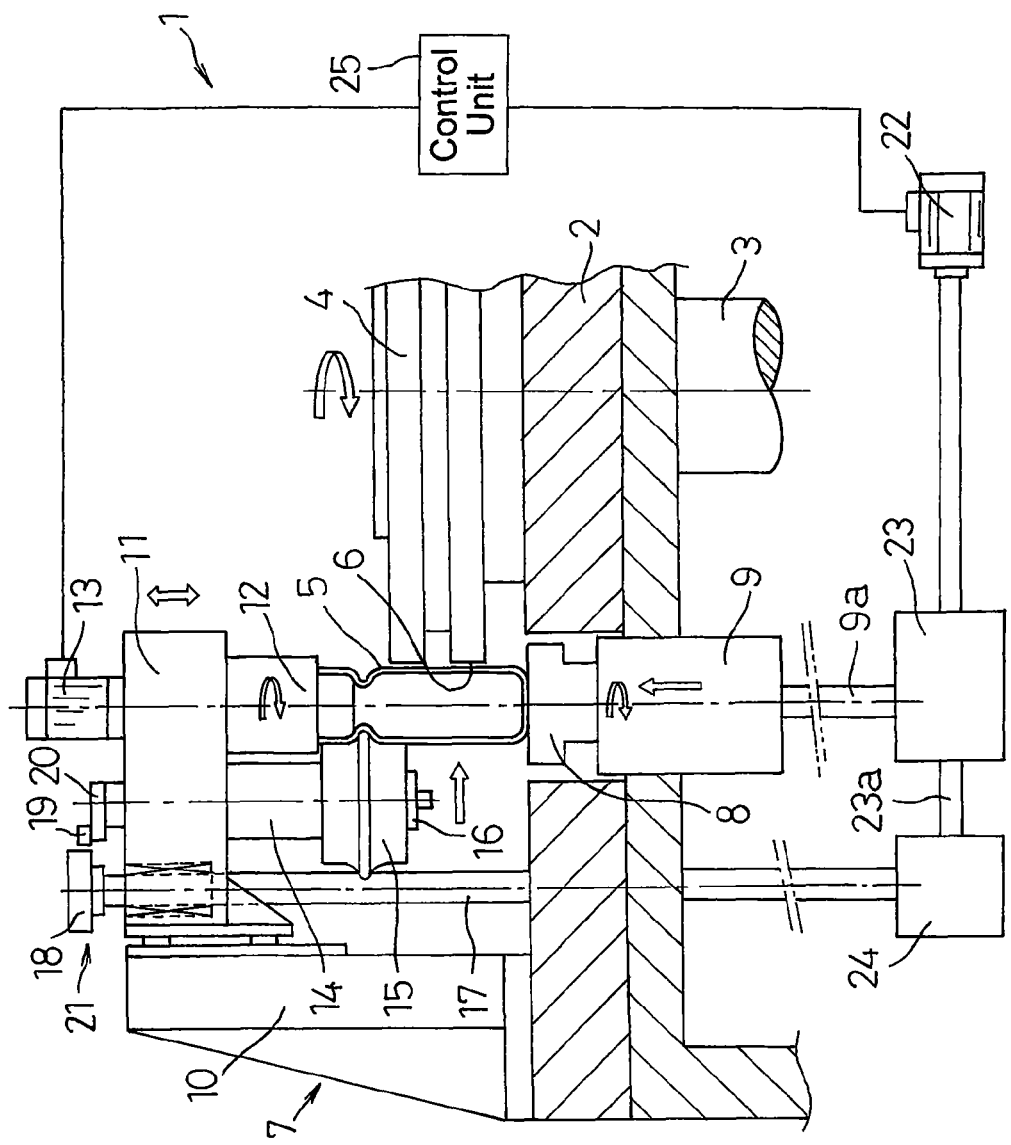
FIG. 1 is a longitudinal sectional view of a groove-forming processing station in a cylindrical battery manufacturing apparatus according to a first embodiment of the present invention.

A first embodiment of the present invention will be described in detail with reference to the drawings. FIG. 1 is a longitudinal sectional view of a groove-forming processing station (groove-forming processing device) 7 in a manufacturing apparatus 1 of a cylindrical battery. In FIG. 1, reference numeral 2 refers to a base plate, and a rotor 4 which is intermittently rotated by a rotary shaft 3 is disposed on the center of the top of the base plate 2. In the outside periphery of the rotor 4, a plurality of holder sections 6 for holding battery cases 5 of the cylindrical batteries is disposed in a circumferential direction at regular intervals and the rotor 4 is intermittently rotated at the disposition interval of the holder sections 6. In each stop position of the holder sections 6 of the rotor 4, there is a station for carrying out each manufacturing process of the cylindrical battery. For example, a carrying-in station which carries the battery case 5 in the holder section 6 for holding it, an electrode plate group insertion station which inserts an electrode plate group into the battery case 5 and injects an electrolyte, the groove-forming processing station which carries out groove-forming processing on the outside periphery of the battery case 5 above the electrode plate group, a sealing plate connection station which connects a sealing plate to a lead upwardly pulled out of the electrode plate group, a sealing plate fitting station which inserts and fits the sealing plate, which has a gasket on the outside periphery thereof, into an opening of the battery case, a sealing station which inwardly crimps the rim of the opening of the battery case for sealing, an exterior film wrapping station which wraps an exterior film around the outside periphery of the battery case, and a carrying-out station which takes and carries the completed cylindrical battery out of the holder section, and the like are provided. By sequentially passing through these stations, the cylindrical batteries can be manufactured.

In the groove-forming processing station 7, a receiving die 8 on which the bottom of the battery case 5 is mounted and supported is provided so as to be flush with the top face of the base plate 2. The top face of the receiving die 8 is flat, and the battery case 5 which has been held in the holder section 6 and slid on the base plate 2 with the rotation of the rotor 4 is smoothly mounted on the receiving die 8. The rotatable receiving die 8 is supported by a push-up means 9 so as to be pushed up by a predetermined amount from a position flush with the top face of the base plate 2.

A supporting frame 10 is erected on the base plate 2 in a position outward away from the position of the receiving die 8 in the radial direction of the rotor 4, and the supporting frame 10 supports an elevating frame 11 which can vertically move. The elevating frame 11 is extended inward to a position directly above the receiving die 8 in the radial direction of the rotor 4 so as to be fit on the rim of the opening of the battery case while facing toward the receiving die 8. Also, a core 12 which is fitted into the inner periphery of the opening is detachably provided in the elevating frame 11. A plurality of cores 12 (12a, 12b) is prepared in accordance with battery sizes and the core 12 is exchanged in accordance with the diameter of the battery case 5. Rotation driving means 13 which is composed of a servomotor for rotating the core 12 is provided on the elevating frame 11 and drives to rotate the battery case 5 through the core 12.

The elevating frame 11 is provided with a movable member 14 which is movably supported in the directions getting near to and going away from the core 12, and a groove-forming roller 15 is detachably attached to the movable member 14 by an attachment piece 16. The groove-forming roller 15 is rotatably supported and comes into contact with and is pushed into the outside periphery of the opening of the battery case 5, which is rotated as described above, to carry out groove-forming processing on the opening of the battery case 5. In order to move the movable member 14 toward the side of the core 12 and push the groove-forming roller 15 into the outside periphery of the battery case 5, a plate cam 18 is fixed on a rotatably supported rotary shaft 17, and a cam follower 19, which is engaged with the plate cam 18, is coupled to the movable member 14 through a coupling member 20 in the elevating frame 11. The movable member 14, the coupling member 20, the cam follower 19, the plate cam 18, and the rotary shaft 17 compose push-in means 21 of the groove-forming roller 15. According to the structure of the roller push-in means 21, the groove-forming roller 15 is pushed into by the same amount from the same position even if the diameter of the battery case 5 varies, and hence the groove-forming roller 15 is exchanged in accordance with variation in the diameter of the battery case 5.

A driving motor 22 drives an input shaft 9a of the push-up means 9 through a reduction gear 23, and the receiving die 8 is pushed up in accordance with the amount of rotation of the input shaft 9a. The other output shaft 23a of the reduction gear 23 is coupled to the rotary shaft 17 through a bevel gear unit 24. Thus, the push-in amount of the groove-forming roller 15 synchronizes with the push-up amount of the receiving die 8 with certain relation.

Figure 2:
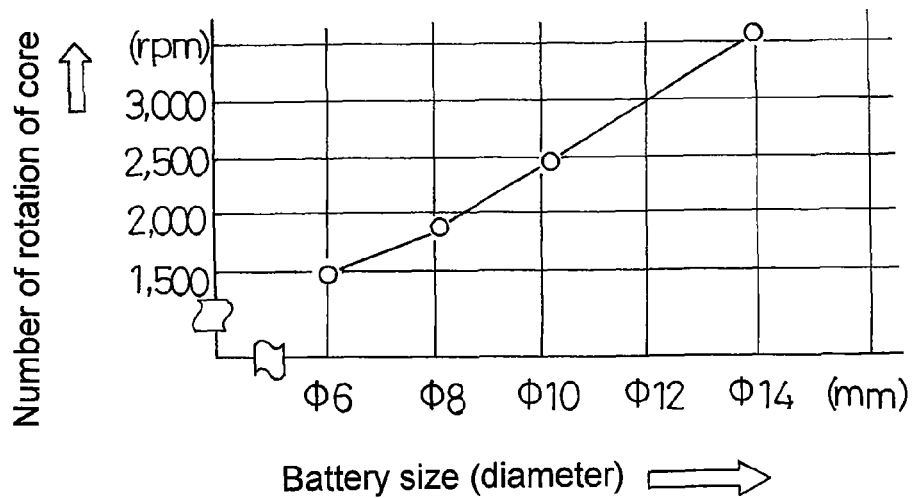
FIG. 2 is a graph showing the relationship between the diameter of a battery case and rotational speed according to the embodiment.

A control unit 25 controls the drive of the driving motor 22 and the rotation driving means 13 composed of the servomotor. The control unit 25 controls the driving motor 22 in a constant manner even if the size of the diameter of the battery case 5 varies, so that the push-in of the groove-forming roller 15 and the push-up of the receiving die 8 up are concurrently carried out to each certain position at a certain speed. The control unit 25, on the other hand, controls the rotation driving means 13 so that the amount of push-in of the groove-forming roller 15 per unit rotation perimeter and per unit of time approximately becomes a certain value even if the diameter of the battery case 5 varies, in other words, as shown in FIG. 2, the rotational speed is increased in accordance with increase in the diameter of the battery case 5.

Figure 3:
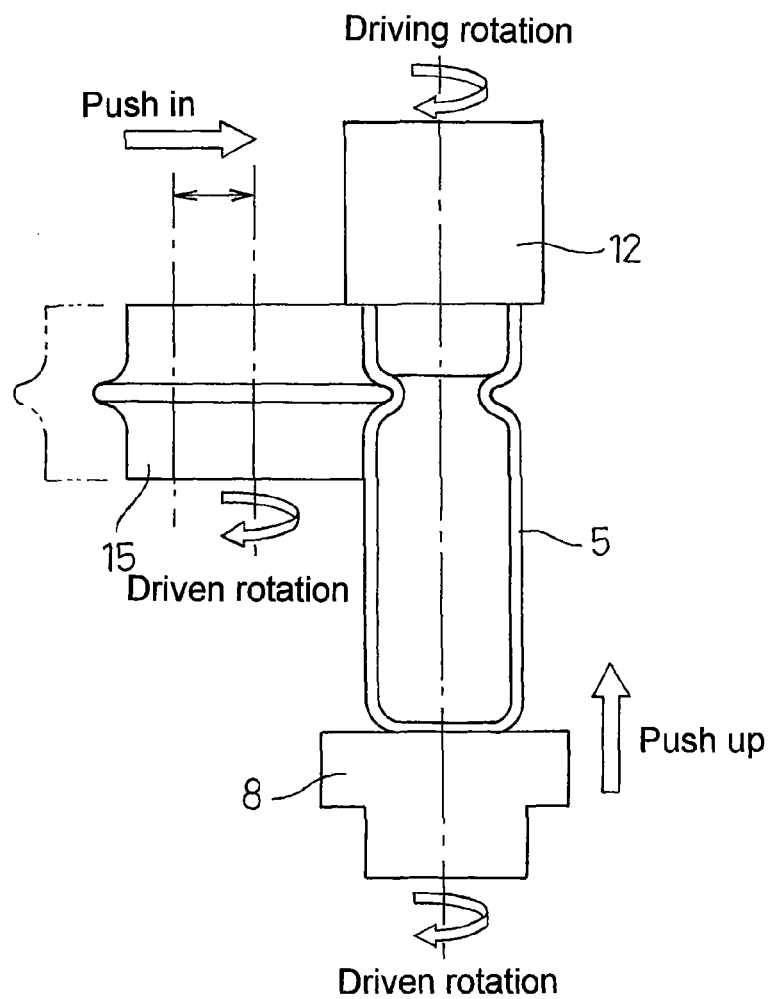
FIG. 3 is an explanatory view of the operation in a groove-forming processing process according to the embodiment.

In the foregoing configuration, in the groove-forming processing process on the outside periphery of the opening of the battery case 5, as shown in FIG. 3, the elevating frame 11 moves down in a state where the receiving die 8 supports the bottom of the battery case 5 so that the core 12 is fitted into the opening of the battery case 5. The battery case 5 is held between the core 12 and the receiving die 8, and then the rotation driving means 13 drives to rotate the core 12 so that the battery case 5 rotates together with the receiving die 8. Subsequently, by the operation of the roller push-in means 21, the groove-forming roller 15 comes into contact with the outside periphery of the battery case 5. The groove-forming roller 15 is further pushed into the battery case 5 with driven rotation so that the groove-forming processing is carried out on the outside periphery of the opening of the battery case 5. The push-in speed of the groove-forming roller 15 is set approximately constant.

Figure 4A:
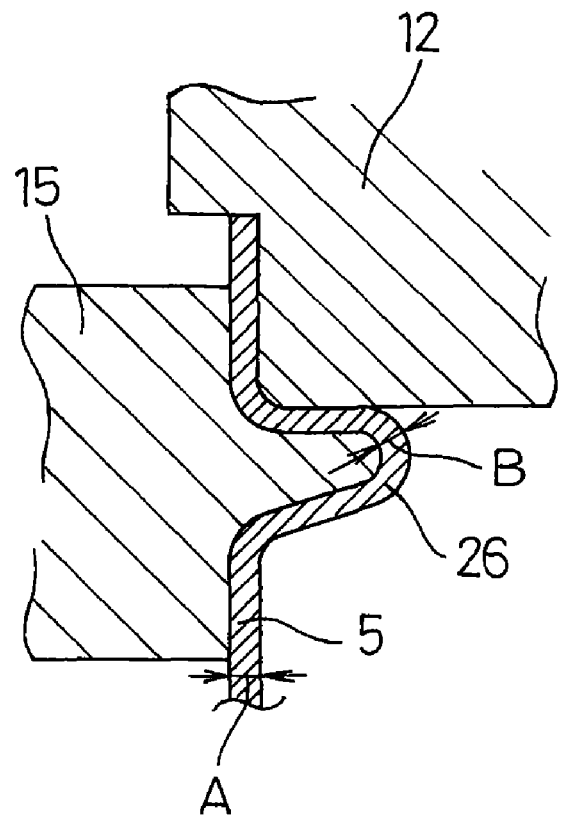
FIGS. 4A to 4B are explanatory sectional views of the effect of pushing up operation in groove-forming processing according to the embodiment.
Figure 4B:
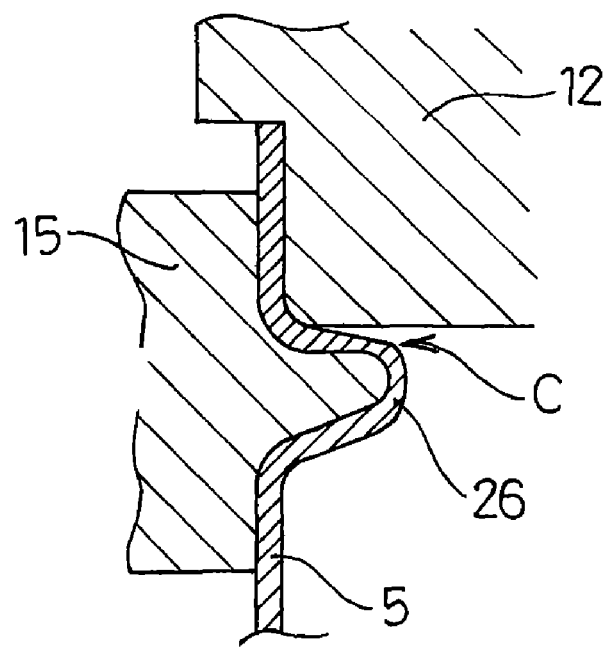

In the foregoing groove-forming processing station 7, as described above, the push-up means 9 moves up to push the battery case 5 up in synchronization with pushing the groove-forming roller 15 into the outside periphery of the battery case 5 in order to appropriately supply a wall material of a lower part toward a groove formed portion of the battery case 5 during the groove-forming processing. In other words, since the push-up means 9 moves by a push-up amount which is appropriately set in accordance with a push-in amount on the battery case 5 to push hie battery case 5 up, the wall material is supplied so that the wall thickness of the groove formed portion of the battery case 5 during the groove-forming processing does not vary. Compensating for thinning a groove portion 26 down in the groove-forming processing, as shown in FIG. 4A, the wall thickness B of a thinnest section of the groove portion 26 is secured at 80% or more of the wall thickness A of the peripheral wall of the battery case 5. On the other hand, when the push-up amount of the battery case 5 is inappropriate, as shown in FIG. 4B for comparison, the end portion C of the upper jaw of the groove portion 26 thins down. However, the foregoing groove-forming processing station 7 certainly prevents the groove portion 26 from thinning down.

In the present embodiment, the rotational speed of the battery case 5 is adjusted so as to increase in accordance with increase in the diameter of the battery case 5. When the groove-forming processing is carried out, the push-in amount of the groove-forming roller 15 per unit rotation perimeter and per unit of time is adjusted so as to approximately become a certain value even if the diameter of the battery case 5 varies. Therefore, a required condition for groove-forming processing can be secured irrespective of variation in the diameter and hence it is possible to carry out the favorable groove-forming processing.

Accordingly, since it becomes possible to manufacture various sizes of cylindrical batteries in a single battery production line by switching in a short time, facility costs can be reduced. Furthermore, since the tact time of the groove-forming processing is approximately maintained in constant even if the battery size varies, it is possible to efficiently manufacture batteries with maintaining the speed of the production line and hence drastically reduce manufacturing costs.

In the present embodiment, the rotatable receiving die 8, which has a flat receiving face, supports the bottom of the battery case 5 from below and the rotatable core 12 is fitted into the opening of the battery case 5 so as to rotate the battery case 5. Thus, since the battery case 5 is driven to rotate at the vicinity of a processed portion from the side of the core which receives pressure by the groove-forming roller 15 during the processing, torsion moment by rotational driving force does not act on the battery case 5. Accordingly, even if the diameter of the battery case 5 is large and the battery case 5 is rotated at a high speed, there is no fear that torsion or buckling occurs in the battery case 5 so that it is possible to stably perform the groove-forming processing.

A second embodiment of the present invention will now be described in detail with reference to the drawings. The same reference numbers refer to components the same or similar to those of the foregoing first embodiment and a description thereof will be omitted. Only differences will be mainly described.

Figure 5:
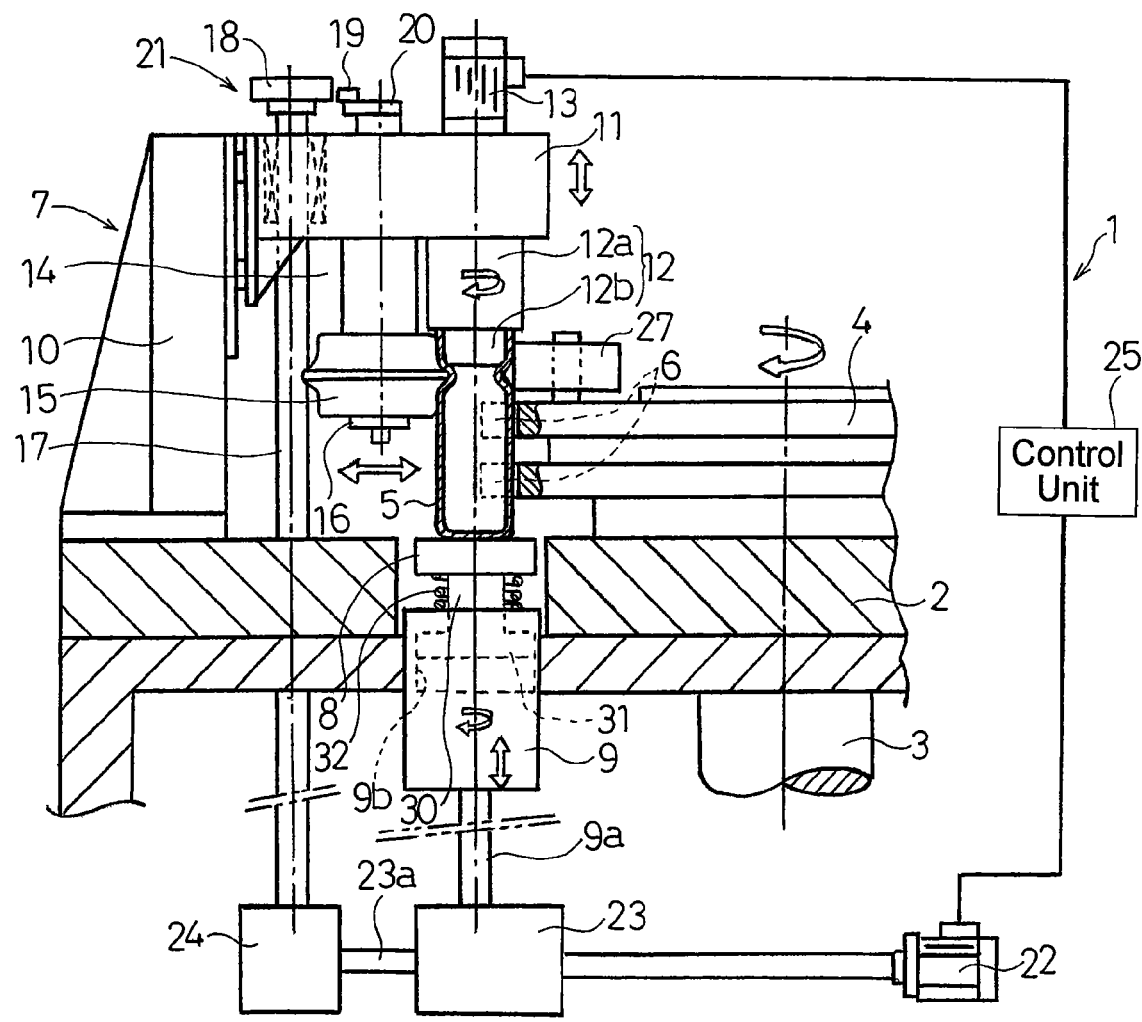
FIG. 5 is a longitudinal sectional view of a groove-forming processing station in a cylindrical battery manufacturing apparatus according to a second embodiment of the present invention.
Figure 6:
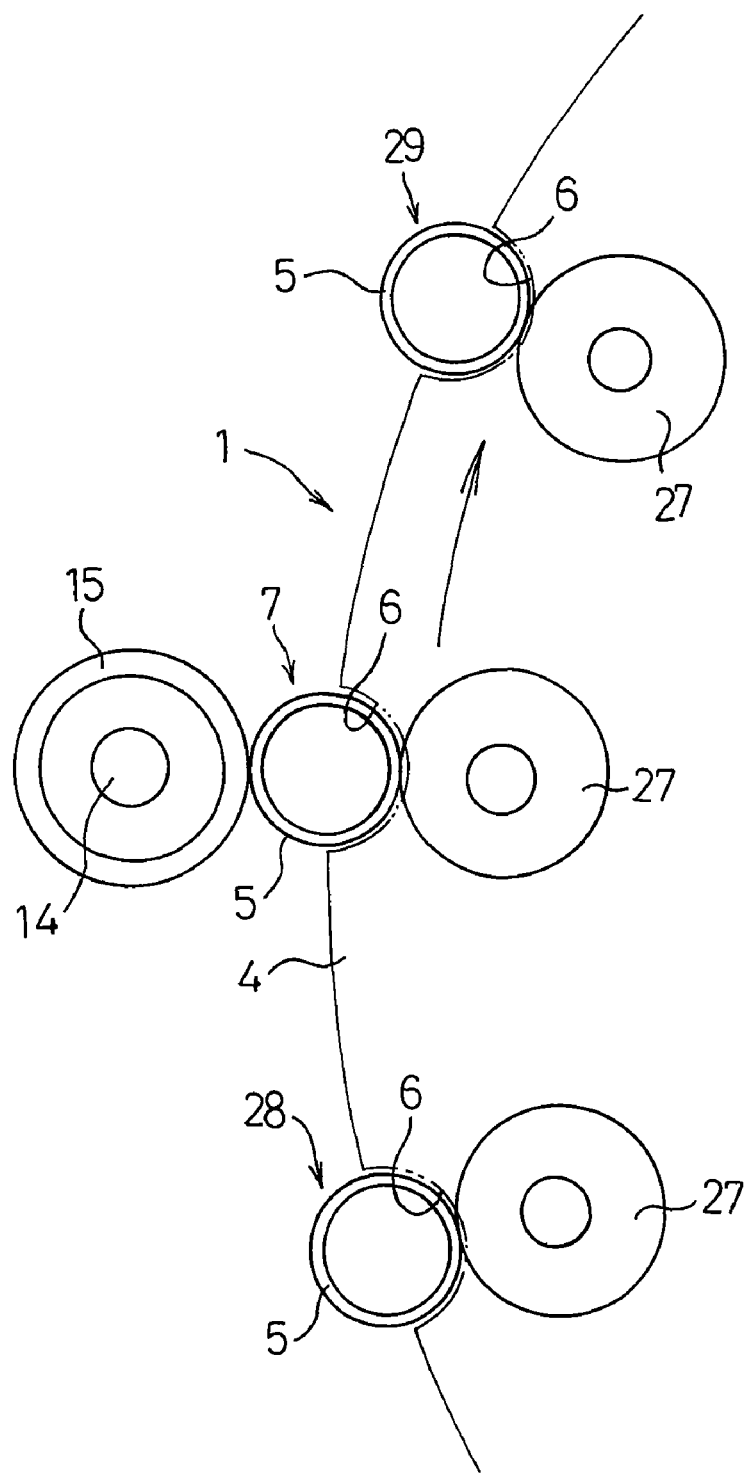
FIG. 6 is a schematic plan view showing the principal portion of the cylindrical battery manufacturing apparatus including the processing station.

In a groove-forming processing station (groove-forming processing device) 7 which embodies the second embodiment of the present invention, as shown in FIGS. 5 to 7, in order to prevent the escape in a direction opposite to the groove-forming roller 15 that occurs when the outside periphery of a battery case 5 rotating at a high speed receives the press force of a groove-forming roller 15 and the bending of the battery case 5 in a radial direction, a backup roller 27 is provided in the vicinity of a holder section 6 so as to be opposed to groove-forming roller 15. The backup roller 27 prevents the battery case 5 from being bent by receiving the press force of the groove-forming roller 15 and acts so as to turn the escape of the battery case 5 in the radial direction by the press force of the groove-forming roller 15 toward the axial direction of the battery case 5.

The backup roller 27, as shown in FIG. 6, is rotatably provided in the inward vicinity of each holder section 6 of the rotor 4 in an electrode plate group insertion station 28, the groove-forming processing station 7, and a sealing plate connection station 29 of stations provided in order of processes along the rotational direction of the rotor 4 of a cylindrical battery manufacturing apparatus 1.

A receiving die 8 is coupled to a guide member 31 through a coupling shaft 30, and the guide member 31 is fitted into a guide hole 9b of push-up means 9 movably up and down. A compression coil spring 32 is provided between the receiving die 8 and the push-up means 9 in such a manner as to be wound around the coupling shaft 30. Under normal conditions, the receiving die 8 is biased upward by the compression coil spring 32 and is held in an upper limit position in which the guide member 31 comes into contact with the top inner face of the guide hole 9b. In the upper limit position of the foregoing receiving die 8, the top face thereof is flush with the top face of a base plate 2. In groove-forming processing, an input shaft 9a moves the push-up means 9 up by a predetermined amount set in advance in accordance with the wall thickness of the battery case 5 and the depth of a groove portion to be formed, and the receiving die 8 is pushed up by the spring force of the compression coil spring 32 which is compressed and increased with the push-up means 9 being moved up.

According to a groove-forming processing method using the cylindrical battery manufacturing apparatus 1 of the second embodiment of the present invention having the foregoing configuration, since the backup roller 27 prevents the battery case 5 from being bent by receiving the press force of the groove-forming roller 15, the backup roller 27 can act so as to turn the escape of the battery case 5 in the radial direction by the press force of the groove-forming roller 15 toward the axial direction of the battery case 5. Thus, even in the case of rotating the battery case 5 with a large diameter at a high speed (for example, approximately 4500 rpm), there is no fear that torsion or buckling occurs in the battery case 5 and hence it is possible to stably perform the groove-forming processing.

In order to push the battery case 5 up, the compression coil spring 32 is compressed in accordance with the moving up of the push-up means 9 and the spring force of the compression coil spring 32, which is gradually increased with compression, is supplied to the battery case 5 through the receiving die 8. Thus, when variations occur in a process where the wall thickness of the groove portion varies during the groove-forming processing due to slight difference in a wall material supplied condition in accordance with difference in the wall thickness of the battery case 5 and the like, the spring force by the compression of the compression coil spring 32 varies by following the variation in the wall thickness in order to absorb the variations. Therefore, it is possible to further certainly prevent the wall of the groove portion 26 from being made thin and hence stably form the groove portion 26 into a precise shape.

Rotation driving means 13 composed of a servomotor, as described in the first embodiment, is controlled so that the push-in amount of the groove-forming roller 15 per unit rotation perimeter and per unit of time approximately becomes a certain value even if the diameter of the battery case 5 varies, in other words, rotational speed is increased in accordance with increase in the diameter of the battery case 5 (refer to FIG. 2).

Figure 8A:
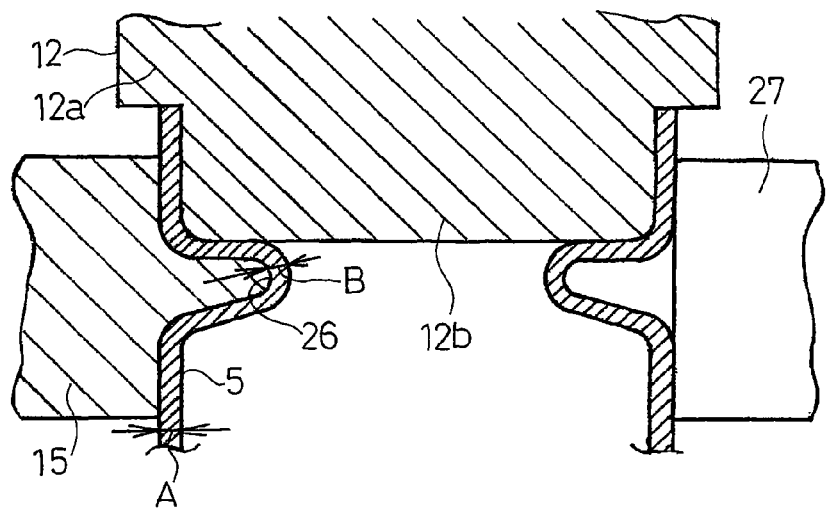
FIGS. 8A to 8B are explanatory sectional views of the effect of pushing up operation in groove-forming processing according to the embodiment.
Figure 8B:
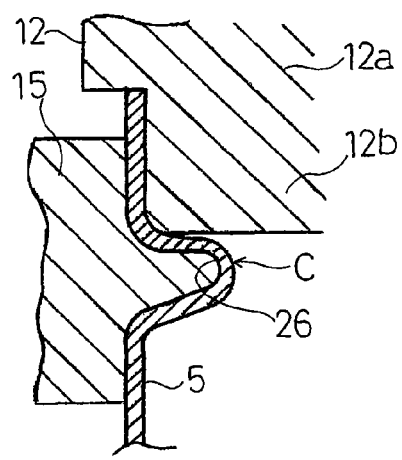

As a result of this, as with effects obtained in the first embodiment, compensation for thinning the wall thickness of the groove portion 26 down in the groove-forming processing, as shown in FIGS. 8A to 8B, secures the wall thickness B of a thinnest section of the groove portion 26 at 80% or more of the wall thickness A of the peripheral wall of the battery case 5. Therefore, it is possible to certainly prevent the end portion C of an upper jaw of the groove portion 26 from thinning down, which occurs when the push-up amount of the battery case 5 is inappropriate.

Figure 9:
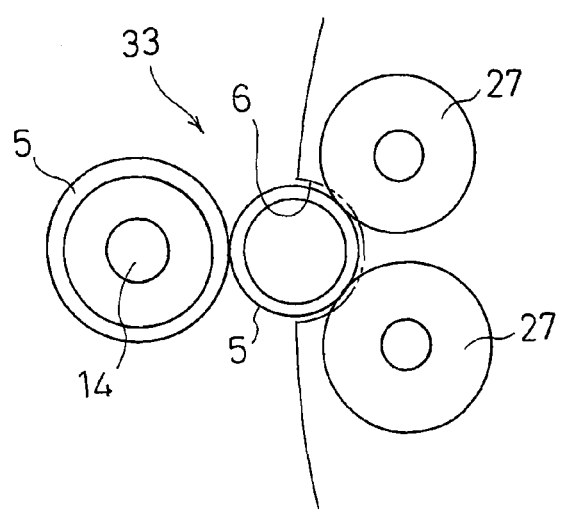
FIG. 9 is a schematic plan view showing the principal portion of a cylindrical battery manufacturing apparatus according to a third embodiment of the present invention.

FIG. 9 is a schematic plan view showing a groove-forming processing station (groove-forming processing device) 33 in a cylindrical battery manufacturing apparatus 1 according to a third embodiment of the present invention. The cylindrical battery manufacturing apparatus 1 shown in FIG. 9 is provided with two backup rollers 27 which are identical to that provided in the apparatus of the second embodiment. The two backup rollers 27 are disposed in positions symmetric with respect to an extension line passing through respective axis of a groove-forming roller 15 and a battery case 5. Thus, it is possible to smoothly rotate the battery case 5 while the two backup rollers 27 can further certainly prevent the battery case 5 from being bent by receiving the press force of the groove-forming roller 15. Therefore, it is possible to smooth turn the escape of the battery case 5 in a radial direction by the press force of the groove-forming roller 15 toward the axial direction of the battery case 5.

INDUSTRIAL APPLICABILITY

According to the present invention, as described above, in the groove-forming processing on the outside periphery of the battery case, the rotational speed of the battery case is adjusted so that the push-in amount of the groove-forming roller per unit rotation perimeter and per unit of time approximately becomes a certain value. Thus, the single cylindrical battery manufacturing apparatus can favorably carry out the groove-forming processing irrespective of difference in the size of a diameter. Since facility costs are reduced and tact time is maintained approximately in constant even if the battery size differs, the cylindrical battery is efficiently manufactured. Accordingly, the present invention is favorably applicable to the manufacture of various kinds of batteries having the groove-forming processing process.

Furthermore, the rotatable backup roller, which is in a fixed position, comes into contact with the outside periphery of the battery case on the opposite side of the groove-forming roller so that the backup roller prevents the occurrence of bending of the battery case due to receiving the press force of the groove-forming roller. Thus, the backup roller prevents the battery case from being bent by receiving the press force of the groove-forming roller and acts so as to turn the escape of the battery case in the radial direction by the press force of the groove-forming roller toward the axial direction of the battery case. Thus, since the battery case after the completion of the groove-forming processing has only internal residual stress in the axial direction and does not have internal residual stress in the radial direction, its shape does not change in the radial direction due to the internal residual stress. Therefore, it is possible to precisely secure a required shape and hence the present invention is favorably applicable to the manufacture of various kinds of batteries having the groove-forming processing process.

The invention claimed is:

1. A method for manufacturing a cylindrical battery, the method comprising:
    allowing a cylindrical battery case with a bottom to contain an electrode plate group;
    carrying out groove-forming processing on an outside periphery of an opening of the battery case;
    disposing a sealing plate in the opening of the battery case through a gasket; and crimping and sealing an end of the opening of the battery case, wherein:

in the groove-forming processing, the battery case is rotated and a rotatable groove-forming roller comes into contact with and is gradually pushed into the outside periphery of the opening of the battery case in a state where a core corresponding to a diameter of the opening of the battery case is fitted into the opening of the battery case to support the battery case from an inner peripheral side, and in the groove-forming processing, a rotational speed is set based on size of the battery so that a push-in amount of the groove-forming roller per unit rotation perimeter and per unit of time becomes a certain value even when the diameter of the battery case varies in size.

2. The method for manufacturing a cylindrical battery according to claim 1, wherein a receiving die which has a flat receiving face and is rotatable supports the bottom of the battery case from below and the rotatable core fitted into the opening of the battery case rotates the battery case.

3. The method for manufacturing a cylindrical battery according to claim 2, wherein the receiving die is pushed up in synchronization with pushing the groove-forming roller in and a push-up amount is regulated in accordance with a push-in amount in order to make a wall thickness of a thinnest portion of a processed groove 80% or more of a wall thickness of a peripheral wall.

4. A method for manufacturing a cylindrical battery, the method comprising:

pressing and gradually pushing a rotatable groove-forming roller against and into an outside periphery of a battery case in the vicinity of an opening of the battery case to carry out groove-forming processing, while the battery case is rotated with an edge face of the opening of the battery case and a bottom face thereof being held from above and below, wherein:

each battery case with a different diameter is rotated at a rotational speed which is set based on size of the battery so that a push-in amount of the groove-forming roller per unit rotation perimeter and per unit of time becomes a certain value, and a rotatable backup roller which is in a fixed position makes contact with the outside periphery of the battery case on the opposite side of the groove-forming roller so that the backup roller prevents occurrence of bending of the battery case by receiving a press force of the groove-forming roller.

5. The method for manufacturing a cylindrical battery according to claim 4, wherein a plurality of backup rollers are provided in positions symmetric with respect to an extension line passing through respective axis of the groove-forming roller and the battery case in order to prevent occurrence of bending of the battery case by receiving the press force of the groove-forming roller.

6. A groove-forming processing device comprising:
a receiving die for supporting a battery case;
a core which is to be fitted into an opening of the battery case and is exchangeable corresponding to a diameter of the battery case;
rotation driving means for rotating the battery case;
a groove-forming roller which is rotatably supported and is pushed into an outside periphery of the opening of the battery case to carry out groove-forming processing on the opening of the battery case;
roller push-in means for pushing the groove-forming roller into the outside periphery of the opening of the battery case;
push-up means for pushing the receiving die upward; and
control means for controlling the rotation driving means so as to increase a rotational speed, which is set based on size of the battery, in order to make a push-in amount of the groove-forming roller per unit rotation perimeter and per unit of time become a certain value even when the diameter of the battery case varies.

7. The groove-forming processing device according to claim 6, wherein the rotation driving means rotates the core and the receiving die is rotatable.

8. The groove-forming processing device according to claim 6, wherein:

the roller push-in means pushes the groove-forming roller into from the same position by the same push-in amount even when the diameter of the battery case varies, and the groove-forming roller is exchangeable in accordance with variation in the diameter of the battery case.

9. The groove-forming processing device according to claim 6, wherein:

the receiving die is disposed in such a manner that a top face thereof is flush with a base plate and the push-up means can move the receiving die up, and the core, the rotation driving means, the groove-forming roller, and the roller push-in means are provided in a elevating frame which is vertically movable along a supporting frame erected on the base plate.

10. The groove-forming processing device according to claim 9, wherein the roller push-in means comprises a plate cam provided in a rotary shaft which rotates in conjunction with the push-up means and a movable member on which a cam follower making contact with the plate cam is fixed, the movable member being supported by the elevating frame movably in a radial direction of the core, and wherein the movable member supports the groove-forming roller.

11. The groove-forming processing device according to claim 6, wherein the backup roller which comes into contact with the outside periphery of the battery case on the opposite side of the groove-forming roller to prevent the occurrence of bending of the battery case by receiving the press force of the groove-forming roller is rotatably provided in a fixed position.

12. The groove-forming processing device according to claim 11, wherein a plurality of backup rollers are provided in positions symmetric with respect to an extension line passing through respective axis of the groove-forming roller and the battery case.

* * * * *